Oct. 18, 1932.    O. U. ZERK    1,883,280
LUBRICATING APPARATUS
Filed March 26, 1930    2 Sheets-Sheet 1
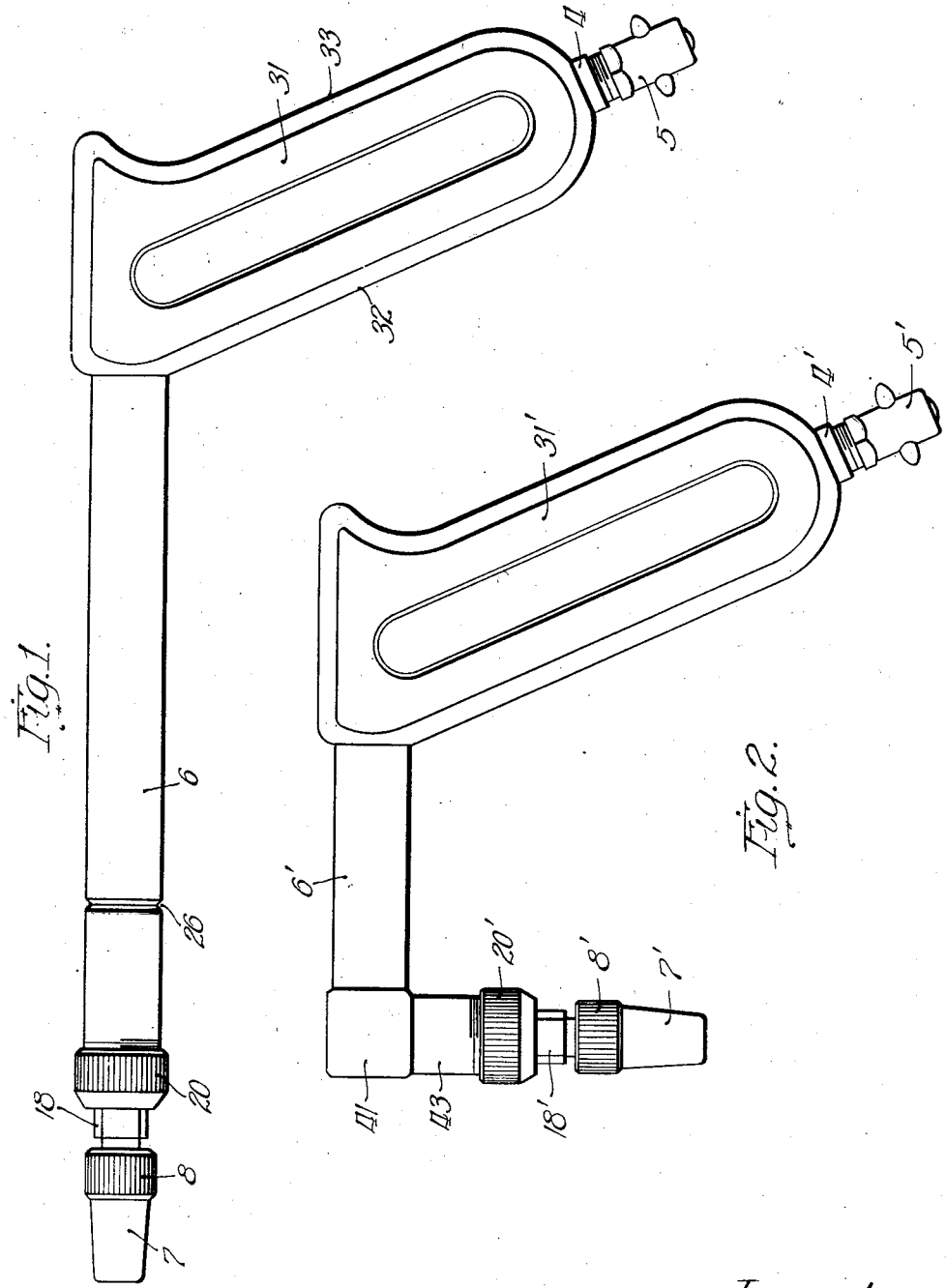

Oct. 18, 1932.    O. U. ZERK    1,883,280
LUBRICATING APPARATUS
Filed March 26, 1930    2 Sheets-Sheet 2
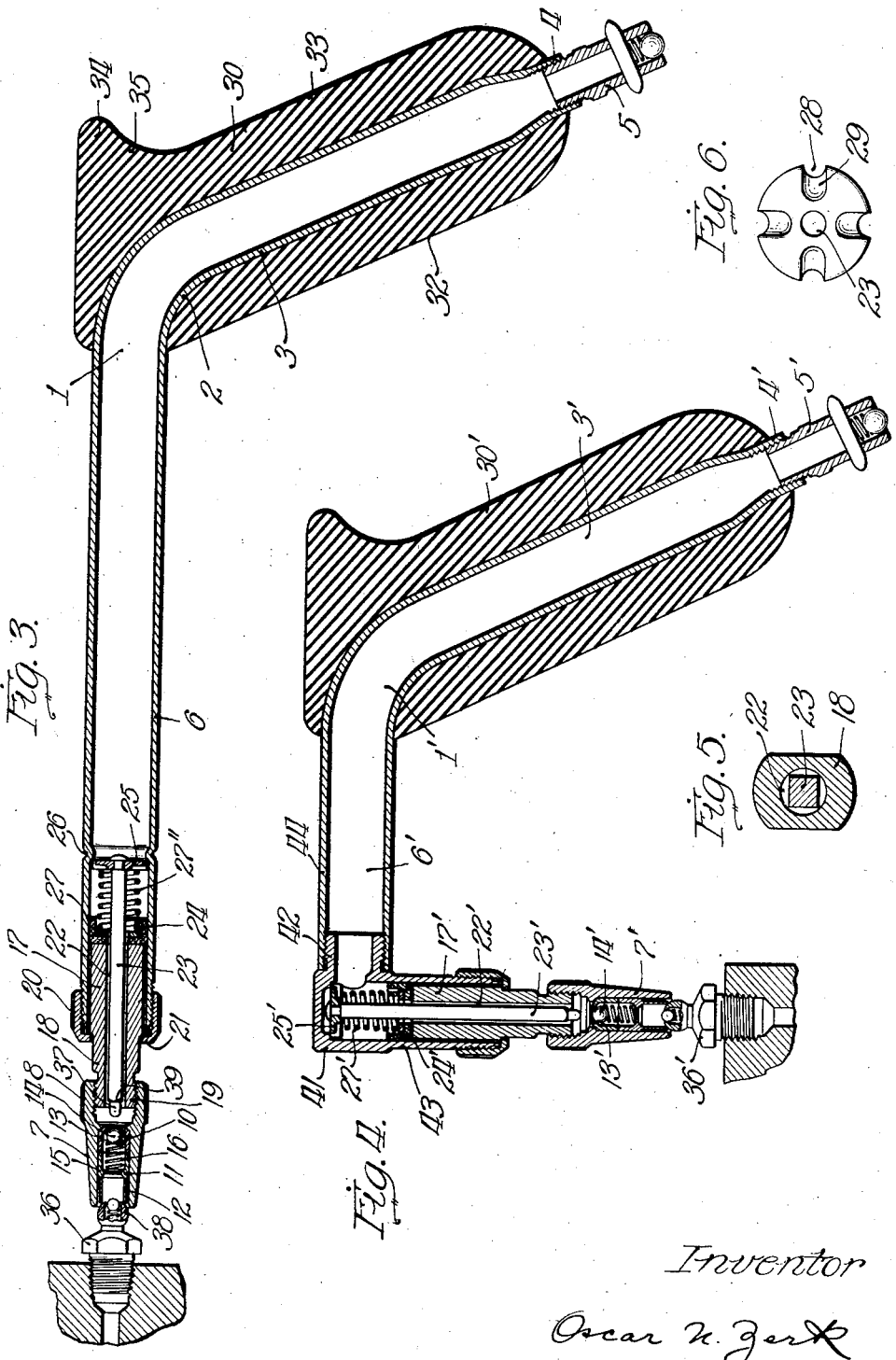
Inventor
Oscar U. Zerk Patented Oct. 18, 1932

1,883,280

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed March 26, 1930. Serial No. 438,918.

My invention relates generally to lubricating apparatus for servicing bearings and relates more particularly to lubricating apparatus involving appliances adapted for use at service stations for the purpose of providing the lubricant receiving nipples, individually associated with bearings of a mechanism, such as an automobile chassis, with a supply of lubricant under pressure.

Nipples commonly employed for communiacting lubricant to the bearing surfaces of bearings of an automobile chassis, or other mechanism, are commonly of two distinct types, namely, the interlocking type employing separable, rigidly interlocking, lubricant dispensing nozzle and lubricant receiving nipple coupler elements, and secondly, the contact type wherein lubricant sealing engagement between a lubricant dispensing nozzle and a lubricant receiving nipple is manually maintained during the lubricating operation by manual force exerted longitudinally of the nozzle to effect pressure engagement between cooperating contacting surfaces of the nozzle and nipple.

My present invention relates to the latter or contact type and although not limited thereto, has a more particular application to the contact type of lubricating apparatus disclosed in my United States Patent No. 1,748,819, issued February 25, 1930, and in my co-pending application for United States Letters Patent, Serial No. 430,720, filed February 24, 1930, wherein a resilient tubular metallic nozzle element is employed to effect a lubricant tight contacting engagement with a lubricating nipple from any one of a plurality of different angular directions.

In the lubrication of the chassis bearings of automobiles, and the like, at service stations where lubrication service is rendered, lubricating mechanisms are commonly installed which in general comprise a relatively long lubricant dispensing hose of special construction to adapt it to convey lubricant under high pressure from a source, generally a motor operated or air pressure operated compressor.

From the compressor lubricant is conveyed under pressure, by a hose, to a terminal lubricant dispensing nozzle which is adapted for interchangeable application to nipples individually associated with the bearings; a manually operable valve is usually interposed in the hose line near the nozzle, to control the flow of lubricant from the nozzle.

My invention is also applicable to other high pressure lubricant pumps preferably of the portable type which, mostly, are manually operated. In this kind of pump a separate manually operable valve interposed in the hose line is not necessary because these pumps eject a measured amount of lubricant, only, when manual force is applied.

Service station lubricating mechanisms of these types are now in general use. They include a nozzle of the interlocking type attached to the end of a flexible hose.

Due to the fact that a large number of cars are equipped with the interlocking type of lubricant receiving nipples and a still larger number of cars with the contact type of nipples and because most of the greasing apparatus of service stations are still equipped with the older interlocking type of coupling and because the interlocking type of coupling does not fit the contact type of nipple, so-called "adapters" are commonly used which will permit a car equipped with the contact type of nipples to be lubricated with a greasing station outfit equipped with the interlocking type of coupling.

These adapters consist of an interlocking nipple, a tubular extension of the straight or elbow type and a nozzle of the contact type. Adapters of this kind are disclosed in my co-pending application for United States Letters Patent Serial No. 399,965 filed October 16, 1929.

Adapters of this prior type are objectionable since whenever a contact system is used it is imperative that sufficient pressure is exerted between nozzle and nipple to create a leakproof contact. In order to maintain this leakproof contact, means must be employed which will facilitate the easy application of manual pressure.

For this reason, grease guns of the contact type are equipped with pistol grip handles so designed that the minimum amount of pressure may be exerted against the sensitive palm of the hand. Without such a pistol grip it is very difficult to maintain the necessary pressure between nozzle and nipple.

The above described simple adapters which are of small tubular form, hooked into a small tubular nozzle of the interlocking type do not have any pistol grip means or other similar means against which a substantial pressure can be exerted and maintained. Adapters of this kind do also easily slip from engagement with nipples of the contact type because it is practically impossible to hold the greasy and slippery adapter rigidly while lubricating, especially when an elbow adapter is used.

Because very insufficient pressure can be exerted against this type of adapter the back pressure created between the contact type nozzle and contact type nipple is greater than the manual pressure capable of being exerted against this type of slippery adapter with the result that a very large amount of lubricant escapes between the contact type of nozzle and nipple every time lubrication takes place.

Also, in the use of the above prior type of adapters, connected to a long flexible hose, where a manual operated valve is situated about two feet from the adapter, only a relatively weak check valve is used in the contact type of nozzle, like those used in the nozzles of the contact type for grease guns, which may preferably be like those disclosed in my co-pending application for United States Letters Patent, Serial No. 430,720, filed February 24, 1930.

A normally closed valve which may be provided in the interlocking type of nozzle and which is opened incidental to connection with the interlocking type of nipple, attached to the adapter, will be continuously kept open during the time the adapter is connected to the interlocking type of nozzle.

The weak check valve connected to the contact type of nozzle which opens by the pressure of the lubricant can only withstand low pressure, say about 25 pounds to the square inch.

It is a well known fact that grease always contains a large amount of air bubbles of various sizes which make a body of grease compressible. The cubic capacity of the grease in the flexible hose between the manual operated valve and the end of the adapter is usually about three cubic inches. The grease in this portion of the flexible hose when under 2,000 pounds pressure per square inch will compress to about 2¾ cubic inches, or less.

When, therefore, the manually operable valve is closed after pressure was previously applied and the contact type nozzle moved away from the contact type of nipple, the compressed grease in the flexible hose between the manually operated valve and the end of the adapter will expand to its former capacity of about 3 cubic inches, with the result, that the expanded ¼ cubic inch of grease will shoot out of the contact type of nozzle every time the contact type of nozzle is disconnected from the contact type of nipple subsequently to use on relatively resistant bearings such as those of a used automobile chassis, which may require a lubricating pressure of as much as 2,000 pounds per square inch to inject lubricant in the bearings.

Since the opening in the contact type of nozzle of the older contact type lubricating systems is about $\frac{3}{32}$ of an inch, about 3 feet of grease will escape through the contact type of nozzle after the same has been disconnected from the contact type of nipple, because the cubic capacity of a cylinder of grease of $\frac{3}{32}$ outside diameter and 3 feet in length is about ¼ of a cubic inch. The length of this escaping grease cylinder depends, of course, on the amount of pressure which is necessary to lubricate the bearing and of the amount and size of air bubbles in the grease. At a very tight bearing this grease cylinder is about 3 feet long and at the bearing with medium resistance it may only be 6 inches long.

It can be seen that the old type of adapter described above makes the use of a contact type of lubricating system a very smeary, unclean and wasteful greasing operation, providing the chassis of an automobile is greased in a public greasing station, and it, therefore, gives the false impression that the simpler and more efficient contact system is a smeary one, which is not necessarily the case.

In order to eliminate the troublesome escape of grease every time the contacting nozzle of an adapter is disconnected from the contact type of nipple, a normally closed valve could be placed behind the contacting nozzle which is opened when the contacting nozzle is pressed against the contacting nipple, similar to that described in my United States Patents No. 1,645,888 issued Oct. 18, 1927, and 1,692,320, issued Nov. 20, 1928. However, this expedient is also found to be objectionable since as the pressure in the lubricating system is increased, it is much more difficult to manually open the valve.

An object of my invention is to provide an improved adapter in which by a given manual effort, a maximum amount of manual pressure may be exerted against the contact type of nipple.

Another object of my invention is to provide an improved adapter for lubricating purposes, wherein no substantial amount of lubricant may escape when the terminal nozzle thereof is disconnected from the nipple.

Another object of my invention is to provide an improved adapter wherein the advantages of a pistol grip form of hand grip may be effectively realized.

Another object of my invention is to provide an improved adapter having a hand-grip of pistol-grip form, and a dispensing portion of an elbow type whereby when the contact type of lubricating nipples are placed in a direction where a straight adapter would not be applicable, ready access may be had thereto.

Another object of my invention is to provide an improved adapter, susceptible to the provision of a powerfully restrained check valve, in or in connection with a nozzle of the contact type, and which valve will open only when the pressure effected by the lubricant pump, to which the adapter is connected, has reached a very large value.

Another object of my invention is to provide an improved lubricant dispensing adapter, having a strongly retractive differentially operative check valve, wherein, as the pressure of the lubricant effected by the lubricant pump to which the adapter is connected is increased, less manual force will be necessary to open the check valve, which is a highly advantageous result exactly opposite to that resulting from the operation of the apparatus of my above mentioned prior United States Patents Nos. 1,645,888 and 1,692,320.

Another object of my invention is to provide improved mechanism in which such a powerfully retracted check valve is included, which is lubricant tight under high pressure.

Another object of my invention is to provide a new type of pistol grip construction, whereby rubber, paper mâché, metal or other materials of pistol-grip or other suitable shape encase and support a bent lubricant conveying tube leading from one end of the adapter to the other.

Another object of my invention is to provide an improved adapter, as aforesaid, wherein all moving parts are readily interchangeable.

Another object of my invention is to provide an improved type of adapter as aforesaid which is susceptible of connection to a conduit able to be flexed, similar to that shown in my co-pending application for United States Letters Patent No. 399,965, filed October 16, 1929.

Another object of my invention is to provide improved means for connecting my new form of adapter in a quick detachable manner to an existing lubricating apparatus.

Another object of my invention is to provide an improved adapter wherein one member of a quick detachable interlocking type of coupling is provided, which will enable the same to be connected to the other member of a quick detachable type of coupling connected to an existing lubricating apparatus.

Another object of my invention is to provide an improved adapter adapted for use in connection with any type of contacting type of nozzle and nipple construction, for instance such as disclosed in my Patent No. 1,475,980, issued December 4, 1923, and in which any and/or all of the foregoing objects may be realized.

Other objects of my invention and the invention itself will be apparent from the following description of certain embodiments of my invention in which description reference is had to the accompanying drawings illustrating the said embodiments.

Referring to the drawings:—

Fig. 1 is a side elevational view of an adapter which is a first embodiment of my invention;

Fig. 2 is a side elevational view of an adapter which is a second embodiment of my invention;

Fig. 3 is a longitudinal medial sectional view of the embodiment of Fig. 1;

Fig. 4 is a longitudinal medial sectional view of the embodiment of Fig. 2;

Fig. 5 is a transverse section of an element of each of the said embodiments taken on the line 5—5 of Fig. 4 or of Fig. 3;

Fig. 6 is a plan view of a washer element for either of the said embodiments;

Referring now first to the embodiment illustrated by Figs. 1, 3, 5 and 6, said embodiment is provided with longitudinally aligned tubular barrel and terminal nozzle portions extending from a posteriorly disposed hand-grip of pistol grip form.

The tubular barrel, 1, is bent at 2 to provide an angularly extending arm 3 preferably reduced at its end 4 which is interiorly screw threaded to receive a lubricant nipple 5, screw threaded therein, herein illustrated as being of the Gullberg type, but which may be of any suitable interlocking type to cooperate with the particular type of coupling nozzle employed to dispense lubricant under pressure through a flexible hose from a source of lubricant.

The dispensing elements above referred to are not shown in the drawings of the present application though reference may be had to my co-pending application No. 399,965, filed October 16th, 1929, for a more complete showing thereof.

The arm 6 of the barrel 1 supports the dispensing mechanism with which the adapter is provided, at its forward end, being partially telescopable therein.

The dispensing mechanism includes a nozzle tube 7 having an interiorly threaded enlarged end 8 and an exteriorly tapered tip portion 9, said tip portion being preferably, as shown provided with a cylindrical bore into which the tubular valve element 10 and the tubular element 11, cooperating therewith and providing by a tubular extension 12 a contactor, is press-fitted.

The tubular valve element 10 is provided with an inturned flange 13, providing a valve seat for the valve ball 14 and the tubular element 11 is provided also with an inturned annular flange 15 providing a support for the valve spring 16 which is held in compressed condition between the flange 15 and the valve ball 14 to strongly press the valve ball to seating engagement with the inner surface of said flange 13. The tubular contactor 12 is integrally formed with the elements 11 and is exteriorly relieved, slightly, from engagement with the inner surfaces of the cylindrical bore of the nozzle tip 9 which guards the contactor. The tubular contactor 12 projects nearly to the end of the protecting tip 9 which guards it, and is provided with relatively thin walls of resilient metallic material such as steel or the like.

Telescoped within the forward end of the tubular arm 6 is provided a plunger 17 which projects therefrom by a reduced tubular portion 18 terminating in an exteriorly threaded further reduced end 19, onto which the interiorly threaded enlarged end 8 of the nozzle tube 7 is screw threaded. A cap 20 having its end wall 21 apertured is screw threaded onto the end of the tubular arm 6 with the reduced portion 18 of the plunger projecting telescopably through its aperture and the plunger is retained on the arm 6 by retaining engagement of the annular portion 21 of the cap end wall with a shoulder of the plunger 17 formed by the junction of its enlarged portion 17 with its relatively reduced portion 18.

The plunger is provided with a central bore 22 and provides a conduit for conveying lubricant from the tubular arm 6 to the nozzle 7, previously described.

Concentrically disposed within the cylindrical bore 22 of the plunger 17 is provided a valve operating rod 23, which as best shown in Fig. 5, is square in cross-sectional form, its corners engaging the walls of the bore 22 and its four sides being so relieved therefrom that lubricant may flow from the barreled tube 6 along the sides of the rod 23 to the interior of the valved nozzle tube 7. A cup leather packing 24 is seated by its radial flange on the inner end of the plunger 17 and engages by its tubular flange with the inner walls of the bore of the arm 6 of the tubular barrel. A washer 25 is rigidly affixed to the end of the rod 23 and is continuously pressed against an inwardly crimped annular portion 26 of the tube 6 by a spring 27 disposed between said washer and a washer 27 seated within the cup leather packing 24. The washer 25 is provided with a plurality of grooves 28 which extend longitudinally along the side edges of the washer and then inwardly towards the rod 23 as shown at 29, to provide passages for lubricant from the interior of the barrel arm 6 to the interior of the helical spring 27 even though during the operation of the apparatus, said spring is compressed an amount sufficient to bring its successive convolutions into contact.

A handle grip 30 of rubber, papier mâché, metal, or phenolic condensate material is rigidly molded onto the arm 3 of the tubular barrel 1 and is of modified pistol grip form having preferably flattened sides 31 and rounded front and rear surfaces 32 and 33, and preferably has a rearwardly turned projection 34 providing a longitudinally concaved and transversely convex surface portion 35 to engage the inner surface of the hand between the thumb and index finger.

The apparatus above described in operation is first connected to a hose nozzle of suitable form to make interlocking lubricant dispensing engagement therewith, whereby lubricant supplied through the hose, not shown, from a source of lubricant under high pressure, such as a lubricant pump deriving power from an electric motor, air or water pressure, or the like, may be communicated through the nipple 5 to the interior bore of the barrel 1, to fill said barrel and the tubular passages of the plunger, and nozzle, which are closed within the nozzle 7 by the valve ball 14 strongly pressed by the spring 16 to its seat.

Except during lubricating periods the valve ball maintains a closure against escape of lubricant from the nozzle by virtue of the power of the spring 16 which must be made strong enough to withstand the pressure of lubricant exerted against its exposed surface, since the valve ball is pressed to its seat from an opposite direction to that from which the pressure of lubricant is received.

To supply a lubricant receiving element such as the nipple 36, assumed to be mounted in lubricant communicating relation to an element of bearing to be lubricated, with lubricant from the barrel 1, the nozzle tip 7 is projected over the parti-spherical tip 38 of the nipple, to effect lubricant sealing contacting engagement between the inner annular edge of the end of the contactor 12, and the nipple 36, and also to operate the valve 14.

When sufficient manual pressure exerted upon the grip 30 is attained, the plunger 17 will be received further within the barrel tube 6 against the power of the helical compression springs 27, until the tip 37 of the valve operating rod 23, engages the valve ball 14, and unseats it to permit lubricant to pass the valve through the contactor into the nipple 36, and thence under maximum pressure from the source of lubricant to the bearing parts served by said nipple.

It will be noted that the valve ball is moved from its seat by pressure exerted upon it by the rod 23 from the same direction as is pressure of lubricant exerted thereupon tending to unseat the valve ball.

When the rounded shoulder 39 of the rod 23 is projected against the inturned flange 13 providing the valve seat, it substantially closes the passage against escape of lubricant additional to that previously discharged to the nipple.

When the manual pressure thrust is relieved the valve ball is quickly receded by the strongly retractive spring 16.

Referring now to the embodiment of my invention illustrated in Figs. 2 and 4, the apparatus provided therein is identical to that described previously for the embodiment of the other figures, except that the lubricant dispensing apparatus comprising the nozzle, valve and valve operating apparatus is disposed at an abrupt angle to the tubular arm 6' of the bent tubular barrel having the hand grip supporting tubular arm 3' with accompanying nipple 5' as before.

This is accomplished by providing a tubular elbow fitting 41 having relatively angularly extending arms 42 and 43, the first having telescoped therein the plunger 17' with cup washer packing 24', helical spring 27' and grooved washer 25' supporting the valve operating rod 23'. Also the arm 43 supports at its end the tubular nozzle 7', and the parts are provided with associated parts as in the foregoing embodiment.

The arm 42 is quite short, in the embodiment illustrated, and the end of the barrel arm 6' is screw threaded thereover. The apparatus of Figs. 2 and 4 operates in the same manner of that of the foregoing embodiment, except that the operator, to establish and maintain lubricant sealing contact with a nipple such as that shown at 36' and which because of interposed parts might be inaccessible to a straight type adapter of the foregoing embodiment, may advantageously grasp the hand grip 30' with one hand and place his other hand over the surface 44 of the barrel tube 6' to intensify the lubricant sealing contact and the pressure serving to unseat the valve ball 14' by engagement therewith of the tip of the valve rod 23'.

Having thus described my invention in two different embodiments, specifically in order to convey the proper understanding of my invention, I am aware that numerous and extensive departures may be made from the embodiments herein illustrated and described, but without departing from the spirit of my invention, and it will be understood that many and various equivalent elements of the said embodiments may be substituted for those shown, but without departing from the spirit of my invention.

I claim as my invention:

1. Lubricant dispensing means of the class described, comprising a tube, a valve therefor, a spring overpowering the effect of fluid pressure tending to open the valve, and manual means comprising a nozzle at one end of the tube, movable relatively thereto, for overpowering said spring.

2. A terminal dispensing apparatus for a dispensing hose of a high pressure lubricating system, comprising, a tube having a posteriorly disposed lubricant receiving handle portion, a nozzle therefor forming a conduit extension for said tube and reciprocable relative thereto, a valve controlling the flow of lubricant from the nozzle, and exposed to pressure of lubricant, communicated to the tube by the hose, tending to open the valve, a valve spring exerting pressure on the valve overpowering the effect of lubricant pressure on said valve, and means responsive to a relative reciprocating movement of said tube and nozzle to manually open said valve against the pressure of said spring.

3. Lubricating apparatus of the class described, comprising a tube having two angularly disposed arms, a pistol-type grip on a lubricant receiving one of the arms, and a contact type nozzle supported by the other arm and extending angularly therefrom towards the same side of the said other arm as does the grip supporting arm.

4. Apparatus of the type described comprising a tube of substantially U-form, means at an end of one of the tube arms for connection with a lubricant supply hose, and a dispensing contact type nozzle at the end of the other tube arm.

5. A lubricant dispensing apparatus comprising a tubular barrel having lubricant receiving handle and lubricant dispensing end, a plunger reciprocable in the dispensing end, a contact type nozzle carried on an end of the plunger, a check valve controlling the flow from the nozzle, and means stationary with respect to the barrel adapted on relative reciprocation of the barrel and plunger to open the said valve.

6. A lubricant dispensing apparatus comprising a tubular barrel having lubricant receiving handle and lubricant dispensing end, a plunger reciprocable in the dispensing end, a contact type nozzle carried on an end of the plunger, a check valve controlling the flow from the nozzle, and means including a rod supported by one end, by the barrel interiorly thereof, responsive to relative reciprocation of the barrel and plunger to open the said valve.

7. A lubricant dispensing apparatus comprising a tubular barrel having lubricant receiving handle and lubricant dispensing end, a tubular plunger reciprocable in the dispensing end, a contact type nozzle carried on an end of the plunger, a check valve controlling the flow from the nozzle, and means including a rod, extending by a free end through the bore of said plunger and having lateral surfaces spaced from the walls thereof, and engaged by its other end with said barrel, responsive to relative reciprocation of the barrel and plunger to open the said valve by engagement therewith by its said free end.

In testimony whereof I hereunto affix my signature this 24 day of March, 1930.

OSCAR U. ZERK.